United States Patent Office 3,488,799
Patented Jan. 13, 1970

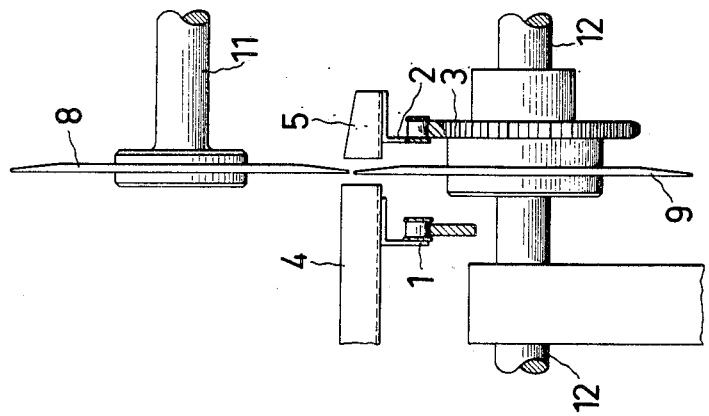
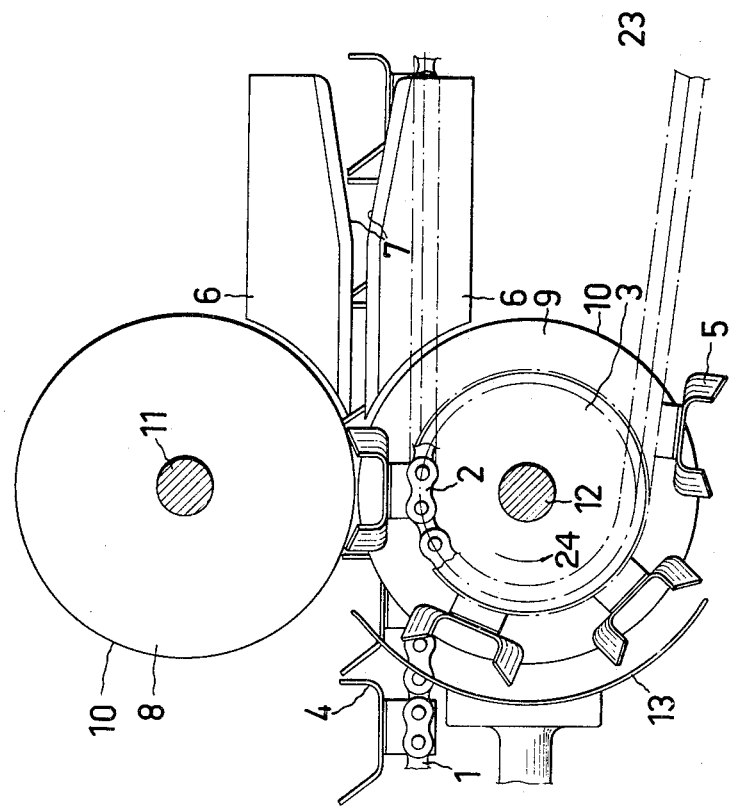

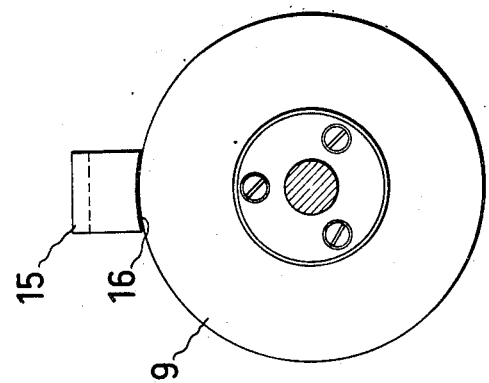
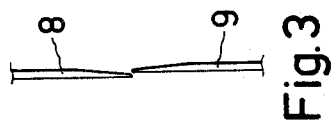
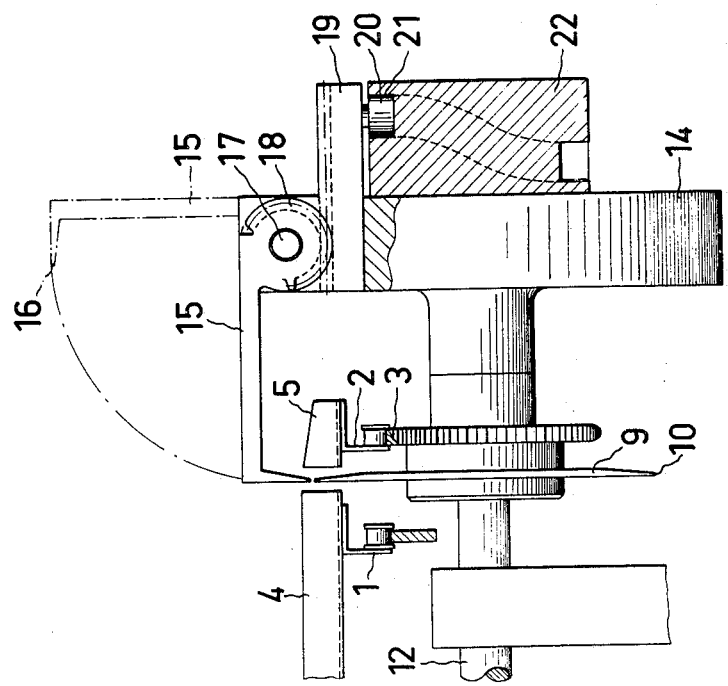

3,488,799
FISH HEAD SEVERING AND ENTRAIL REMOVING MACHINE
Paul Danielsson, Stockholm, Sweden, assignor to Arenco Aktiebolag, Stockholm-Vallingby, Sweden
Filed May 29, 1967, Ser. No. 641,979
Claims priority, application Sweden, June 10, 1966, 8,018/66
Int. Cl. A22c 25/14; A22b 5/18
U.S. Cl. 17—60                4 Claims

ABSTRACT OF THE DISCLOSURE

A fish dressing machine comprising two incision knives cutting incisions behind the gill arches of the fish and leaving the inner portion of the fish including the gullet uncut, two cooperating pinching means squeezing together the uncut portion of the fish and means to withdraw the head of the fish together with the gullet from the body of the fish.

---

The present invention relates to a fish dressing machine having a conveyor for advancing the fish laterally and provided with two knives located in the path of movement of the fish and adapted to engage behind the gill arches of the fish, between which cutting edges of the knives the gullet of the fish can pass without being cut off, in addition to which means are provided for withdrawing the severed head of the fish together with its entrails from the body of the fish.

Machines of this type are known to the art, the known machines being provided with rotary cutters adapted to sever the head of a fish from its body but not to cut the tough and flexible gullet, whereupon the entrails are pulled out by means of a special conveyor provided with pockets for retaining the fish heads. These machines function quite satisfactorily in most cases, but in certain instances, such as when processing sardines, the gullet of the fish is also severed, resulting in that the entrails of the fish are not removed.

The object of the present invention is to provide a fish dressing machine in which the head of a fish is severed from its body without the gullet of said fish being damaged, and by means of which a more reliable withdrawing of the entrails is obtained. The object of the invention is put into effect by the fact that the knives constitute two incision knives arranged to present an interspace between the cutting edges in which an inner portion of the fish including the gullet can pass without being cut and that two cooperating pinching means, which suitably are mutually resiliently mounted, are arranged behind the cutting knives in the direction of movement of the conveyor, by means of which pinching means the uncut portion of the fish is squeezed together so that the head, with the exception of the gullet of the fish, is severed from said fish. The incision knives serve to provide cuts with evenly cut surfaces in the outer tougher sides of the fish, which as a rule are covered with scales, whereafter it is possible to sever the head of the fish solely by squeezing said fish by means of the pinching members, without damaging the gullet of the fish. According to a simple embodiment of the invention the pinching means comprise two counter rotating circular discs provided with peripheral pinching surfaces and which rotate at a peripheral speed equal to the speed at which the conveyor is advanced. To facilitate withdrawal of the entrails of a fish the one circular disc in one arrangement according to a preferred embodiment is replaced by a hub member rotating coaxially and synchronously with the remaining disc, on which hub radially projecting arms are mounted to pivot in the diametrical plane of the hub, each of the arms being provided with a pinching surface which, by means of an actuator mechanism acting upon each arm, is adapted to be urged against the pinching surface of the disc and, subsequent to the severing of the head of the fish, to clamp fast the gullet thereof against the pinching surface of the said disc whilst the disc and hub effect a necessary rotary movement in order to withdraw the entrails of the fish. The disc may be circular or polygonal in shape, and the pinching surfaces of the arms may be shaped to conform with the shape of the disc.

The invention will now be described more closely with reference to the accompanying drawing, which diagrammatically shows selected embodiments as examples thereof, wherein FIGURE 1 shows a side view of an arrangement provided with circular pinching discs, FIGURE 2 shows an end view of the arrangement in FIGURE 1, FIGURE 3 shows a modified embodiment of the circular discs in FIGURE 1, FIGURE 4 shows an end view, partly in section, of an arrangement provided with a rotating pinching means and a number of pivotable pinching means, and FIGURE 5 shows the rotating pinching means and one of the pivotal pinching means in FIGURE 4, seen from the left in the figure.

Figure 7:
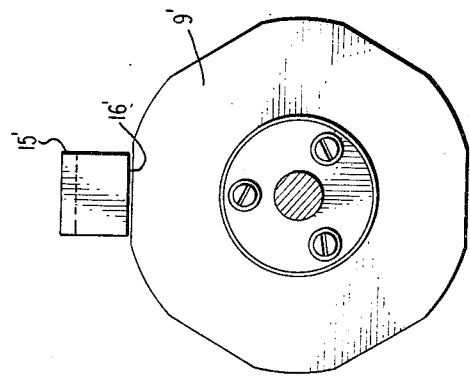
FIGURE 7 shows a modified rotating pinching means and modified pivotal pinching means.

The machine illustrated in FIGURES 1 and 2 has a first endless conveyor 1 which runs over two pairs of wheels, not shown, and a second endless conveyor 2 which runs over a wheel 3, and an additional wheel, not shown. The conveyor 1 is provided with compartments 4 for each fish in which compartments the fishes are intended to be advanced laterally. Located on the conveyor 2 are pockets 5 for the heads of the fish, the pockets being mounted in such a way that when situated in the upper portion of the conveyor 2 they lie in the same plane as the compartments 4, each one opposite to a compartment 4 on the conveyor 1, and the wheel 3 is adapted to drive the conveyor in the direction marked with an arrow 24, at the same speed as the conveyor 1 is driven, by a drive means, not shown. The machine is also provided with two adjustably mounted incision knives 6 (FIGURE 1) which between their cutting edges 7 present an interspace, the center line of which is arranged to coincide with the center plane of the fish passing on the conveyors 1 and 2. Located behind the knives 6, in the direction of movement of the conveyors 1 and 2, are two circular discs 8, 9 situated in the same plane as the knives 6, the peripheries of which discs being designed as obtuse pinching surfaces 10. The disc 8 is mounted on a shaft 11 and the disc 9 on a shaft 12, upon which the wheel 3 is also mounted. The shafts 11 and 12 are driven by a drive means, not shown, in opposite directions and at the same speed.

When the fishes located on the conveyor formed by the conveyors 1 and 2 pass the knives 6 the said knives make an incision on each side of the fishes immediately behind the gill arches. The fishes then pass the discs 8, 9 which enter the knife incisions and force the incisions apart leaving the gullet portion of the fish intact. Irrespective of whether the discs abut each other resiliently or, as is shown in FIGURES 1 and 2, are mounted to present a small clearance between the pinching surfaces 10, the gullet of the fish, which is both strong and tough, passes between the discs without being damaged, while the head of the fish, with the exception of the connection consisting of the gullet, is completely, or substantially completely severed from the fish. The same result is achieved even if the discs 8, 9 are somewhat axially displaced and arranged to overlap each other at the edge portions, by a suitably adapted clearance as shown in FIGURE 3.

Subsequent to a fish having passed the discs 8, 9 the body of the same is conveyed further in a compartment 4 of the conveyor 1, while the head of the fish is carried in a pocket 5 of the conveyor 2 in a downwardly directed, arcuate path, the fish head being retained in the pocket 5 by means of the disc 9 and a plate 13, securely attached to the frame of the machine, while the entrails of the fish are snatched out of the fish body by the sudden pull on the gullet attached to the head, occuring when said head is moved away from the body of the fish by the pocket 5.

A more positive removal of the entrails of the fish is obtained in the embodiment shown in FIGURES 4 and 5, which in principle coincides with the machine shown in FIGURES 1 and 2, but which instead of the disc 8 has a hub 14 mounted on the shaft 12, a number of radially outwardly directed arms 15, only one of which is shown in the drawing being mounted on said hub, and being pivotable in the diametrical plane of the same. Said arms 15 are each provided with an arcuated, obtuse pinching surface 16 and are adapted to urge the pinching surface 16 against the pinching surface 10 of the disc 9. For that reasaon the arms 15 are mounted on the pivotable shafts 17 mounted in the hub 14 and are each provided with a pinion which engages a rack 19, each rack being mounted axially displaceable on the hub 14 and engaging by means of a cam roller 20 a cam curve 21 in a stationary block 22 fixedly mounted in a machine frame.

When a fish is advanced upon rotation of the shaft 12 to a position immediately above the disc 8 the rack 19 of an arm 15 situated opposite the fish is drawn rapidly outwards by the cam curve 21 and the arm 15 is swung with the pinching surface 16 in abutment against the pinching surface 10 of the disc 9. The pinching surface 16 is urged into the incisions made by the knives 6 in the described manner, and presses together the uncut portion of the fish, so that the head is completely or almost completely severed from the body thereof, but without causing damage to the gullet of the fish. On continued rotation of the shaft 12 the head of the fish is carried, as before, in a downwardly directed arcuate path by the pertinent pocket 5, but in this case the gullet of the fish is retained between the pinching surfaces 10 and 16 until reaching a position of rotation of the hub 14, wherein the entrails of the fish have been pulled out by means of the clamped gullet, at the same time as the head of the fish is retained in the pocket 5 by the arm 15. In this position the rack 19 is moved back towards the hub 14 by the cam curve 21, the arm 15 being swung outwards and rotated with the hub 14 back to the upper position where it is once more swung down towards the disc 9.

Figure 6:
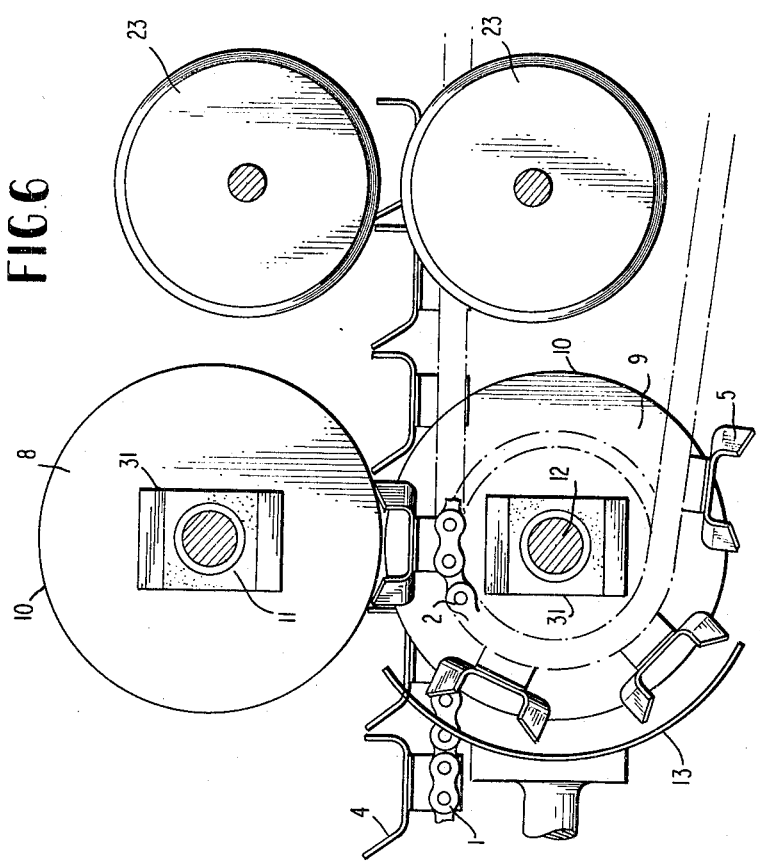
FIGURE 6 shows a side view of the invention with flexible bearings.

It should be noted that no relative movement between the pinching means and the fish should occur in the feeding directions of the fish while the head is being severed, otherwise a non-desired cutting action occurs with the subsequent risk of damaging the gullet portion. Only a low pinching pressure is required, particularly in the case of the embodiment according to FIGURE 3, where the backbone of the fish is subjected to a shearing stress. Thus, either of the pinching means can be flexibly mounted, by conventional means such as flexible bearings 31 on the shafts 11 and 12, as illustrated in FIGURE 6. As previously indicated arms such as 15' as in FIGURE 7 may have a flat pinching surface 16' and the pinching disc 9' coacting with said surfaces may have peripherally distributed flat part-pinching surfaces adapted to cooperate with the pinching surfaces 16'. Further, the incision knives 6 may alternatively be rotary knives 23, as indicated in FIGURE 6.

What is claimed is:
1. A fish dressing machine comprising a conveyor for advancing the fish laterally, two incision knives situated in the path of movement of the fish and arranged to present an interspace between the cutting edges which engage the fish behind the gill arches and leave an inner portion of the fish including the gullet uncut, two mutually cooperating pinching means located behind the incision knives in the feeding direction of the fish and adapted to squeeze together said uncut portion of the fish and means to withdraw the head of the fish from the body, said pinching means comprising two circular discs provided with peripheral pinching surfaces which discs rotate in opposite directions at a peripheral speed which is equal to the advancing speed of the conveyor.

2. A fish dressing machine as claimed in claim 1 characterized in that the discs are axially displaced relative to each other and arranged to overlap at the edge portions thereof, presenting such a clearance that decapitation of the fish is effected without the gullet being damaged.

3. A fish dressing machine comprising a conveyor consisting of two substantially parallel endless conveying means provided with spaced pockets for supporting the body and the head, respectively, of the fish and advancing the fish laterally, two incision knives situated in the interspace between said pockets and arranged to present an interspace between the cutting edges which engage the fish behind the gill arches and leave an inner portion of the fish including the gullet uncut, a rotatable shaft located behind the incision knives in the feeding direction of the fish and parallel to the longitudinal direction of the fish, a disc mounted on said shaft and provided with a peripheral pinching surface rotating with a peripheral speed equal to the advancing speed of the fish and entering into the incision on one side of the fish, a hub mounted on said shaft coaxially to said disc, on which hub are mounted radially outwardly projecting arms which are capable of pivoting in diametrical planes of the hub, and each of which is provided with a pinching surface adapted to the form of the pinching surface of the disc, which pinching surfaces of the arms by means of an actuator mechanism acting on each arm are adapted to be urged against the pinching surface of the disc, and subsequent to severing the head of the fish, to clamp the gullet against the pinching surface of the disc during a part of the rotation of the disc and the hub necessary for withdrawing the entrails of said fish.

4. A fish dressing machine as claimed in claim 3, where the peripheral pinching surface of the disc is flat.

References Cited

UNITED STATES PATENTS

| | | | |
|---|---|---|---|
| 1,449,610 | 3/1923 | Kloster et al. | 17—3 |
| 1,632,200 | 6/1927 | Stafford | 17—3 |

FOREIGN PATENTS

| | | |
|---|---|---|
| 503,752 | 6/1951 | Belgium. |

LUCIE H. LAUDENSLAGER, Primary Examiner

U.S. Cl. X.R.

17—52, 63